United States Patent [19]

Bernaldo

[11] 3,972,738
[45] Aug. 3, 1976

[54] METHOD FOR REPAIR OF PLASTIC-CASED BATTERIES

[76] Inventor: Joe Bernaldo, 1307 E. Elm, Tampa, Fla. 33604

[22] Filed: July 31, 1975

[21] Appl. No.: 600,796

[52] U.S. Cl. ............................................... 136/174
[51] Int. Cl.² ....................................... H01M 10/54
[58] Field of Search ..................................... 136/174

[56] References Cited
UNITED STATES PATENTS

| | | | |
|---|---|---|---|
| 2,398,275 | 4/1946 | Alpert | 136/174 |
| 3,283,637 | 11/1966 | Brenner et al. | 136/174 |

FOREIGN PATENTS OR APPLICATIONS

| | | | |
|---|---|---|---|
| 1,374,016 | 11/1974 | United Kingdom | 136/174 |

*Primary Examiner*—Donald L. Walton
*Attorney, Agent, or Firm*—Theodore D. Lindgren

[57] ABSTRACT

A method for removing and replacing a portion of the sealed top of a defective plastic-cased automotive or marine battery for the purpose of repair of defective cell or cell-connectors.

2 Claims, 6 Drawing Figures

METHOD FOR REPAIR OF PLASTIC-CASED BATTERIES

BACKGROUND OF THE INVENTION

1. Field of the Invention

This invention is associated with the field of automotive and marine battery technology, specifically as related to the repair of such devices to allow economical additional use thereof.

2. Description of the Prior Art

Previous battery construction techniques involved the use of an asphalt-sealed cover plates. The method of sealing facilitated straight-forward repair of batteries by means of heating the asphalt seal for removal of the cover plate to gain access to a defective cell. Following cell repair by removing, repairing, and replacing the cover and the cell, the asphalt seal was easily reformed.

Present-day manufacturing techniques have eliminated the asphalt seal through the use of a complete plastic casing to provide improved moisture resistance. However, the elimination of the asphalt seal also precluded ready access to the battery interior for repair purposes, resulting in the wasteful practice of battery replacement rather than the economical practice of battery repair.

Therefore, it is an object of this invention to achieve an economical and effective repair method suitable for plastic-cased batteries.

SUMMARY OF THE INVENTION

One of the primary failure modes for battery cell failure is not related to the degradation of the lead component of the cell, but is due instead to a defect in the cell-to-cell electrical connection. Such connections are made internally, and are readily accessible only if the battery cover can be removed in the area of interest.

Therefore, in achieving the object of a method for economical and effective repair of plastic-cased batteries, the first step is to provide access through the top of the battery by means of cutting open and removing the top cover section corresponding to the defective cell (or cells). During the cutting operation, to prevent contamination of the battery interior by particulate matter generated by the cutting process, a vacuum hose attachment located next to the cutting edge is used to remove such particulate matter.

The next step is to repair the defective cell; in the common case of a defective electrical connection by means of rebonding or replacing the connection.

The third step is to bond the removed top cover section of the defective cell to a cover plate which is larger than said removed top cover section and which contains hole cutouts to accomodate the cell cap and, if required, the battery terminal post.

The final step is to bond in place on the cut area the removed cover section with attached cover plate, the cover plate overlapping the cut area to provide a fluid seal.

The bonding agent used in the repair process is preferably an epoxy-type compound.

The cover plate may be manufactured by cutting or stamping to appropriate dimension sheet plastic of a type similar to that used in construction of batteries.

DETAILED DESCRIPTION

Figure 1:
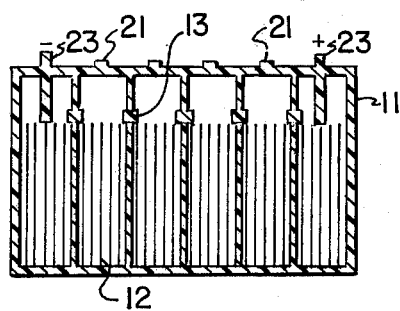
FIG. 1 is the side view of the cross-section of a six-cell battery.

FIG. 1 depicts a cross-sectional view standard six-cell automotive or marine battery 11 constructed using a plastic case with plastic cell partitions and a one-piece plastic cover. It is assumed in this discussion that cell 12 is defective. The defect may or may not be a defective electrical connection between cells caused by defective connector 13.

Previously, the standard practice of manufacturers and users of batteries has been to discard a battery with a defective cell, regardless of whether the defect was minor or major in nature.

Figure 2:
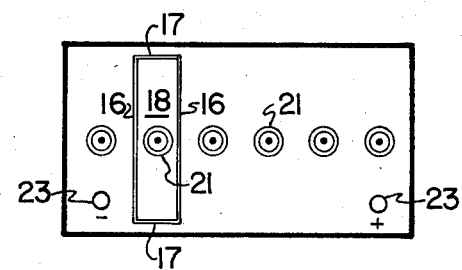
FIG. 2 is the top view of the battery showing the cuts over a defective cell.
Figure 3:
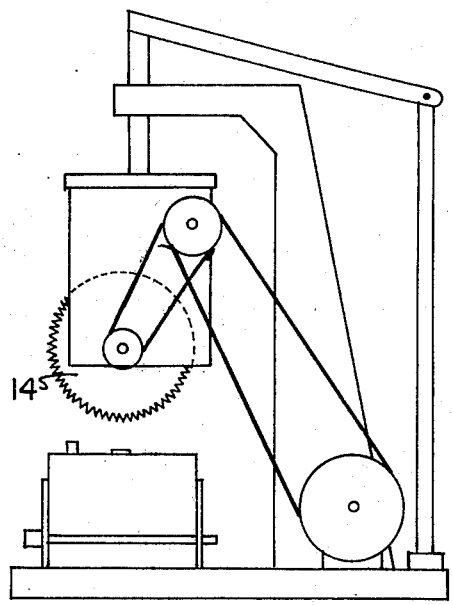
FIG. 3 illustrates a cutting means for use in removing the top of a battery cell.
Figure 4:
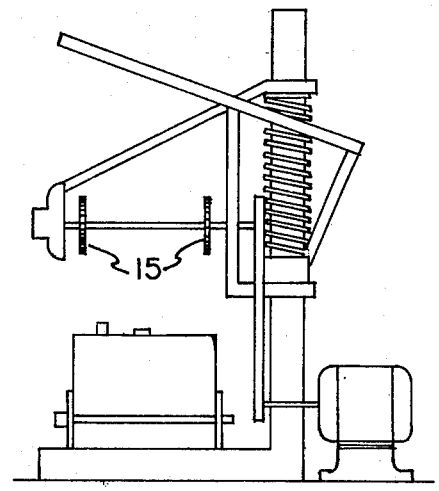
FIG. 4 illustrates a second cutting means for use in removing the top of a battery cell.

The process of this invention attains access to the defective cell 12 by utilizing a cutting means 14 and 15 to open the top of cell 12 along lines indicated in FIG. 2. Preferably the cutting means 14 and 15 consists of two pairs of rotating circular cutting blades. In practice it has been determined that hardened steel saw blades with moderately fine tooth size are adequate for performance of the cutting task. It has been found that one pair consisting of two eight-inch blades is suitable for making cuts 16 as indicated in FIG. 3. The other pair of rotating blades are preferably two inches in diameter and are used to make shorter cuts 17, as also indicated in FIG. 4.

The cutting means 14 and 15 are preferably mounted on a suitable framework of movable rotating shafts and pulleys mounted in relation to a conveyer belt or roller table such that with the battery in proper position the cutting blades will make the proper cuts with one downward motion for each pair rotating blades. The method of construction of cutting means 14 is well-known to those skilled in the art pertaining to the design of machine-shop equipment.

The battery cell 12 is drained of acid prior to being cut open and a vacuum attachment may be used with cutting means 14 to minimize particulate contamination of the cell.

Cell repair is accomplished according to the various methods of repair which are well-known to those skilled in the art of battery repair. In certain cases it may be necessary to drill a hole in the top of an adjacent cell for the purpose of repairing the electrical connector between cells.

Figure 5:
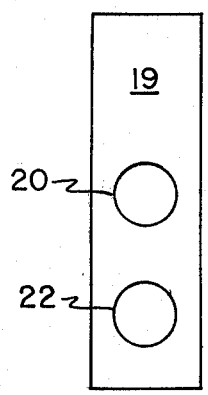
FIG. 5 is a cover plate for use in re-sealing a repaired battery cell.
Figure 6:
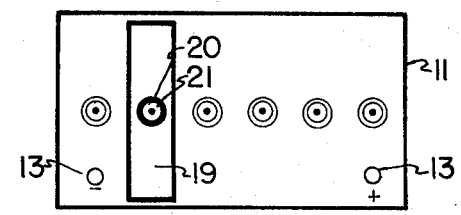
FIG. 6 is a top view of a repaired battery.

Upon completion of the repair of the defective cell 12, the removed top section 18 is replaced by first bonding said top section 18 to a cover plate 19, which may be cut or stamped from a sheet of acid-proof polypropylene plastic. Cover plate 19, shown in FIG. 5, must be larger in dimensions than top section 18 and may be provided with a hole 20 positioned and sized to allow cap 21 to protrude through said hole 20, at the same time extending beyond the edges of top section 18 a distance of approximately one-fourth to one-half inch. When necessary, cover plate 19 may be provided with a second hole 22 for the purpose of allowing battery terminal 23 to protrude.

The final step of the repair is the bonding of cover plate 19 with attached top section 18 to battery cell 12 with top section 18 substantially in its original position. The cell is refilled with acid and the bonding process is checked for leaks.

In practice it has been found that an epoxy type of glue may be used for the bonding process.

It is understood that the process of this invention is not limited to the precise method set forth but that it includes within its purview whatever charges fairly come within the terms of spirit of the appended claims.

I claim:

1. A method for removing and replacing a portion of the sealed top of a defective automotive or marine battery for the purpose of repair of defective cells or cell connectors comprising
   a. Starting with
      i. A sealed battery with defective cell or cell connector,
      ii. A pair of larger parallel rotating circular cutting blades displaced from each other a distance less than the width of said defective battery cell,
      iii. A pair of smaller parallel rotating circular cutting blades displaced from each other a distance less than the length of said defective battery cell,
      iv. A cover plate, and
      v. A bonding means;
   b. Removing fluid from the battery cell;
   c. Placing the defective cell of the battery under one pair of rotating circular cutting blades and causing said blades to cut slots on opposite two of the four sides of the top of said defective cell;
   d. Placing the defective cell of the battery under the other pair of rotating circular cutting blades and causing said blades to cut slots on the remaining two of the four sides of the top of said defective cell;
   e. Removing the top of said defective cell for the purpose of repair;
   f. Accomplishing said repair;
   g. Bonding the top of said defective cell to a cover plate;
   h. Bonding said cover plate with attached defective cell top to the battery in a manner which reseals the formerly defective cell; and
   i. Refilling the battery cell with fluid.

2. The method of claim 1 wherein said parallel rotating circular cutting blades are used in conjunction with a vacuum device for removing particulate matter resulting from the cutting operation.

* * * * *